Oct. 16, 1962     W. C. HITT     3,058,338
ULTRASONIC THICKNESS COMPARATOR
Filed Dec. 26, 1956
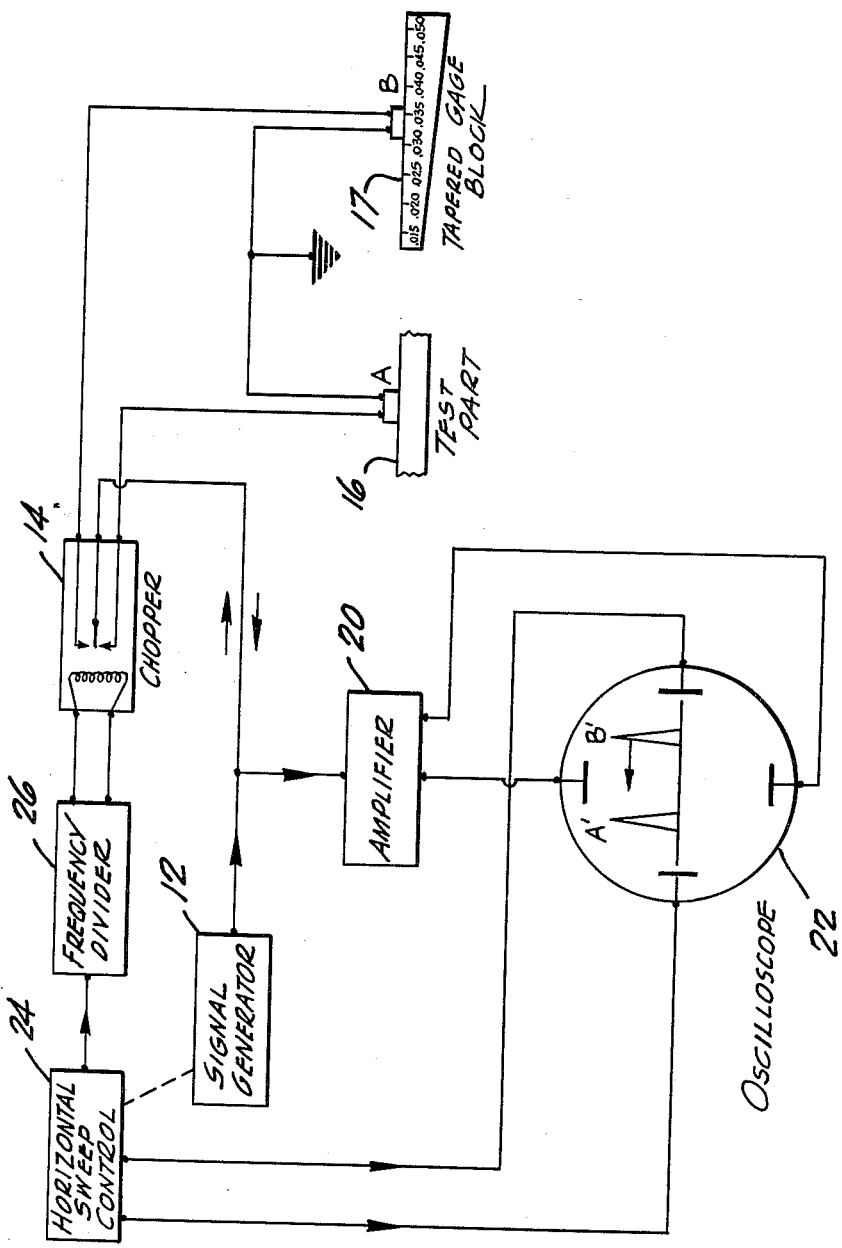
INVENTOR.
WILLIAM C. HITT
BY
Edwin Coates
ATTORNEY.

United States Patent Office 3,058,338
Patented Oct. 16, 1962

3,058,338
ULTRASONIC THICKNESS COMPARATOR
William C. Hitt, Sunland, Calif., assignor to Douglas Aircraft Company, Inc., Santa Monica, Calif.
Filed Dec. 26, 1956, Ser. No. 630,573
18 Claims. (Cl. 73—67.8)

This invention relates to a manner and means of measuring materials or parts by the use of high frequency signals or impulses.

More particularly, this invention relates to a process and apparatus for ascertaining the dimensions of materials by impressing thereon a varying high frequency wave train and simultaneously impressing a similar train at random points on a standard or gage specimen of varying but known dimensions. When it is determined, as by a visual indicator, that the dimension, usually thickness, at a point on the gage specimen is equal to the dimension of the material being measured, the dimension is read directly from the gage.

This invention basically utilizes the phenomenon that when supersonic impulses varying in frequency over an appropriate range are impressed on a material, such material, depending on its thickness and physical properties, will resonate at a frequency in proportion to the material thickness. The apparatus selected for producing this phenomenon in each of the materials to be measured and the standard specimen consists of an electromechanical transducer, such as a piezo-electric quartz crystal, to which is supplied an electrical impulse of continuously, uniformly varying frequency within a predetermined range. Upon "loading" of the transducer by physical contact with a part, the vibrations will be imparted to the part and when resonant frequency is attained the "loading" of the crystal will be appreciably changed, resulting in a change of voltage at the crystal.

As a means of providing a visual signal when the crystal is being resonantly loaded, the increase in crystal output is utilized to control the vertical deflection plates in a cathode ray tube whose horizontal sweep is synchronized with the means by which the applied frequency is varied.

With the horizontal sweep so synchronized, each point across the horizontal trace will provide an indication of the instantaneous impulse frequency applied to the quartz crystal. At the frequency or frequencies at which the crystal is loaded there will be a sharp vertical deflection in the oscilloscope trace. By varying the applied frequency through the predetermined range at a sufficiently high rate, 30 or 60 cycles per second for example, the trace will recur at such a rate as to appear in solid line form.

It has in the past been proposed to appropriately calibrate the oscilloscope face in units of linear measurement whereby an operator would be enabled to obtain a direct reading of material thickness. This system however has several inherent drawbacks, some of which necessitate the performance of compensating calculations, others of which reduce the accuracy of the measurement obtained and still others of which require that the instrument be calibrated or adjusted at very frequent intervals. More specifically, if the cathode ray tube face is calibrated in units of thickness of steel, then when using the instrument to measure aluminum or other non-ferrous metals the reading obtained must be modified by a conversion factor based on the ratio of the velocity of the ultrasonic frequency propagation in steel to such velocity in the non-ferrous metal. Secondly, because of the scale most conveniently employed in calibrating the tube face, the degree of accuracy practicably obtainable is undesirably restricted. Thirdly, as the internal operating characteristics of the oscilloscope vary appreciably with age and use, and reflect changes induced by shock and vibration, it is a definite requirement that the instrument be periodically zeroed in as by adjustment by reference to calibration specimens.

The prime advantage afforded by this invention stems from the use of the electrical components of apparatus for the purpose of comparison of several electrical signals as opposed to the prior use of similarly operating apparatus for obtaining finite characteristics of a single signal. When the apparatus is used for comparison any changes in the operating values of its components reflect their results equally to each of the compared signals and thereby become self-compensating.

It is a feature of this invention that two signals, one for application to the test part and another for application to the gage block, are produced which are identical in wave form and which are, with reference to time, 360° apart. This feature is accomplished by the use of a single signal generator continuously producing impulses, by way of example, varying in frequency over a given range at the rate of 30 cycles per second. By means of a switching arrangement cyclically controlled, directly or indirectly, by the signal generator, alternate cycles of the impulses are respectively directed to the two electromechanical transducers. In this manner it will be seen that, in the example given, each transducer thus will be energized at the rate of 15 cycles per second by identical wave trains.

In order to compare the effects on the transducers so energized when they are contacted with the gage block and the part to be measured, such effects are amplified and indicated by the vertical deflection in traces produced on the face of a single oscilloscope. In the example above given, that is with each transducer alternately energized each at the rate of 15 cycles per second, the horizontal sweep rate is controlled to 30 cycles per second. With this cycling vertical deflections of horizontal sweeps are alternately controlled respectively by the first and second transducers to thus produce two distinct traces. Adopting this mode of oscilloscope control, by causing the two traces to become coincident it can be visually determined that the effects on the transducers are equal. This in turn will be indicative that the thickness of the materials contacted by the transducers, if such materials are of the same physical composition, are equal.

There are other features and advantages of the invention which will become apparent from the following description taken in conjunction with the accompany drawing in which the single FIGURE is a block diagram of apparatus embodying my invention.

The embodiment of the invention shown in the figure includes a signal generator 12 of any of the various known types, one of which is described in U.S. Patent No. 2,431,234 to Rassweiler et al., which cyclically produces a high frequency electrical impulse varying in frequency over a predetermined range from a minimum to a maximum, preferably with the frequency increase varying directly with time. The impulse emitted by generator 12 is led to a switching arrangement, here delineated as chopper 14, operated in a manner hereinafter defined, which feeds alternate full cycles of the impulse respectively to quartz crystals A and B. These crystals A and B are adapted to be brought directly in contact respectively with test part 16, the part to be measured, and a part of known thicknesses 17, shown in the drawing as a tapered gage block having thickness measurements scribed thereon at convenient intervals. It will, of course, be evident that in lieu of the tapered block, a stepped block or several blocks of various thicknesses may be used.

When the impulses are applied to crystals A and B such impulses are converted or transformed into mechanical vibrations, whose frequency varies directly in relation to the frequency of the electrical impulse, and are transmitted into the test part 16 and gage block 17. Upon the attainment of resonant frequency, or harmonics thereof, of the mechanical waves in the part 16 and block 17, as the case may be, the crystals A and B will become effectively loaded thereby experiencing voltage variations therein. The effects of these voltage variations after being amplified by amplifier 20 are applied to the vertical deflection plates of oscilloscope 22, the deflections or pips A' and B' on the oscilloscope face being respectively caused by crystals A and B.

In order to give significance to the positions of deflections A' and B' the horizontal sweep of the oscilloscope is synchronized with the cyclical operation of the signal generator 12. The accomplishment of this synchronization may be attained in any well known manner. As here shown a horizontal sweep control 24 activates the horizontal sweep plates of oscilloscope 22 and such sweep control 24 is mechanically linked, as indicated by a dash line on the drawing, to signal generator 12. The nature of the synchronization is such as to effect one cycle in the horizontal sweep circuit for each cycle of the signal produced by signal generator 12 and also but not necessarily to effect initiation of the horizontal sweep cycle simultaneously with the initiation of the signal wave train. Thus each point across the horizontal trace on oscilloscope 22 will represent the instantaneous frequency of the signal generated. Since, however, the generated signal is divided between crystals A and B the vertical deflection of sweeps of the trace will be alternately controlled by crystals A and B respectively and if the resonant frequencies in the two materials contacted by crystals A and B are different two distinct pips A' and B' will be formed (presuming the absence of harmonics which would result in multiple pips from each crystal).

Referring now back to the drawing, chopper 14 indicated diagrammatically as a D.C. operated single pole double throw switch. Since, as before stated, it is desired to divide the wave trains between crystals A and B, it is apparent that the chopper 14 must be operated at one-half the rate of the signal generator 12. While this may be carried out by direct mechanical drive, it is here illustrated that the function is performed by taking a signal from the horizontal sweep control 24 and reducing its frequency by one-half by means of the frequency divider 26. Thus frequency divider 26 and chopper 14 cooperate to constitute a means for dividing the signal emitted by generator 12 so that single wave trains of impulses varying in frequency over the same range are alternately fed to crystals A and B.

In the use of this apparatus in measuring the thickness of a test part 16 the range of the variable frequency signal emitted by the signal generator is selected to include that frequency which will induce mechanical vibrations in the crystals A and B of such a frequency as to effect resonance, either fundamental or harmonics, in the part. A probe carrying crystal A is then applied to the test part 16 which will in turn become "loaded" at the resonant frequency of the part 16 and produce vertical deflection A' on the oscilloscope face. Applying probe B to the tapered gage block 17 a second deflection B' will appear on the oscilloscope face and, assuming the point on the gage block 17 is of different thickness than that of the test part 16, this deflection B' will be horizontally displaced from deflection A'. By moving crystal B across the gage block 17 the thickness of material below the crystal will vary resulting in horizontal motion of deflection B'. When the deflection B' moves into coincidence with deflection A' it is known that the resonant frequency in each material is the same and, if the test part 16 and gage block 17 are the same material, that is aluminum, steel, etc., then their thicknesses are the same. At this point the thickness of the test part 16 can be read directly by reference to the indicia on the gage block 17. For universal application of the invention it will, of course, be apparent that several gage blocks will be required, one for each type of material, and for each type of metal there will be required one for each range of thicknesses.

It is to be understood that while I have shown and described only the preferred embodiment of my invention there are other forms thereof which will be suggested by a knowledge of the present form and, further, additional uses of this form will be apparent. As for example, while I have shown the vertical deflection in the traces effected by the crystals A and B to appear above the horizontal portion of the trace, the polarity of the signal from one crystal could be reversed which in turn would cause the vertical deflection on the oscilloscope trace to appear below the horizontal. With such modification the vertical deflections would be brought into alignment to ascertain equal thicknesses in the gage block and the test part.

Still other forms of the invention may be made which are contemplated to be within the scope of the appended claims.

I claim:

1. A method of measuring the thickness of material comprising: generating a series of electrical oscillations each constantly varying in frequency over a predetermined range; dividing said series into two further series each comprising alternate oscillations of the first said series and correspondingly varying in frequency over a range; converting said further trains into two series of mechanical oscillations; applying said series of mechanical oscillations respectively to a first part to be measured and to a calibrated part having different thicknesses, one of which is equal to the thickness of the first part, said range in frequency including at least one frequency proportional to the resonant frequency of the mechanical oscillation in the part to be measured; producing an indication of each of the frequencies of the oscillations which are proportional respectively to the resonant frequencies of the oscillations in the part to be measured and the calibrated part; applying the mechanical oscillations to the calibrated part at various of the different thicknesses thereof until the frequencies that are indicated are equal whereat the thickness of the calibrated part is equal to the thickness of the part being measured.

2. A measuring device comprising: generating means producing a continuous series of electrical oscillations each of which varies in frequency over a range between a maximum and a minimum; first and second electro-mechanical transducers adapted to be respectively applied to a test part and a standard part each formed of the same material; dividing means receiving the series of oscillations from the generating means and transmitting alternate oscillations to one and then the other of said transducers and said transducers converting the oscillations connected thereto into mechanical oscillations of varying frequency in the parts to which they are applied; and an oscilloscope having a sweep circuit synchronized with the cycling of the generated oscillations and a deflection circuit actuated by increased loadings on the generating means effected by attainment of resonance of the oscillations within the parts to which the transducers are applied whereby when deflections in the trace of the oscilloscope effected respectively by the test part and standard part occur at the same point on the sweep of the trace the thicknesses of the parts are equal.

3. A measuring device comprising: generating means producing a continuous series of electrical oscillations each of which varies in frequency over a range between a maximum and a minimum; first and second electro-mechanical transducers adapted to be respectively applied to a test part and a standard part each formed of the same material; means receiving the series of oscillations and dividing said series in two further series each of which comprises alternate ones of the oscillations produced by the generating means, said further series being transmitted respectively one to the first transducer and the other to the second transducer, said transducers converting the oscillations connected thereto into mechanical oscillations of varying frequency in the parts to which they are applied; and an oscilloscope having a sweep circuit synchronized with the cycling of the generated oscillations and a deflection circuit actuated by increased loadings on the generating means effected by attainment of resonance of the oscillations within the parts to which the transducers are applied whereby when deflections in the trace of the oscilloscope effected respectively by the test part and standard part occur at the same point on the sweep of the trace the thicknesses of the parts are equal.

4. A measuring device comprising: generating means producing a continuous series of electrical oscillations each of which varies in frequency over a range between a maximum and a minimum; first and second electromechanical transducers adapted to be respectively applied to a test part and a standard part each formed of the same material; dividing means receiving the series of oscillations from the generating means and connecting alternate oscillations to one and then the other of said transducers and said transducers converting the oscillations connected thereto into mechancal oscillations of varying frequency in the parts to which they are applied; and means deriving pulses upon the attainment of resonance of the oscillations in the parts and displaying said pulses on an oscilloscope.

5. Sonic measuring apparatus for determining the thickness of a sample specimen of material, which apparatus comprises, a swept frequency oscillator, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse of substantially the same amplitude and duration in response to each resonant mode excited in said specimens, and means for displaying said pulses upon a cathode ray tube.

6. Sonic measuring apparatus for determining the thickness of a sample specimen of material, which apparatus comprises, an oscillator whose frequency is swept at a predetermined rate, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse of substantially the same amplitude and duration in response to each resonant mode excited in said specimens, and means for displaying said pulses upon an oscilloscope time base swept at said predetermined rate.

7. Sonic measuring apparatus for determining the thickness of a sample specimen of material, which apparatus comprises, an oscillator whose frequency is swept at a predetermined rate, a calibrated specimen of material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse of substantially the same amplitude and duration in response to each resonant mode excited in said specimens, and means for visually displaying said pulses upon a time base which is recurrently swept at said predetermined rate.

8. Sonic measuring apparatus for determining the thickness of a specimen of material, which apparatus comprises, a wedge of said material whose thickness is calibrated along its length, first and second transducers respectively arranged adjacent to said wedge and said specimen, an oscillator whose frequency is swept at a predetermined rate, means for alternately coupling said transducers to said oscillator during mutually exclusive time intervals whereby the connected transducer may interchange electrical and sonic energy between said oscillator and material respectively to effect a marked increasing in the loading of the former when its contemporary frequency corresponds to the frequency at which a resonant mode is excited in the latter, means responsive to each such loading for deriving pulses of substantially the same amplitude and duration, and means for visually displaying said pulses on a time base which recurs at a rate which is an integral multiple of said predetermined rate.

9. Sonic measuring apparatus for determining the thickness of a specimen of material, which apparatus comprises, a wedge of said material whose thickness is calibrated along its length, first and second transducers respectively arranged adjacent to said wedge and said specimen, an oscillator whose frequency is recurrently swept at a predetermined rate, means for alternately coupling said transducers to said oscillator during mutually exclusive time intervals whereby the connected transducer may interchange electrical and sonic energy between said oscillator and material respectively to effect a marked increase in the loading of the former when its contemporary frequency corresponds to the frequency at which a resonant mode is excited in the latter, means responsive to each such loading for deriving pulses of substantially the same amplitude and duration, and means for visually displaying said pulses upon a time base which recurs at a rate equal to said predetermined rate whereby pulses displayed in the same position during adjacent ones of said time intervals are viewed without flicker while all other pulses are viewed with flicker.

10. Sonic measuring apparatus for determining the thickness of a speciment of material, which apparatus comprises, a wedge of said material whose thickness is calibrated along its length, first and second transducers respectively arranged adjacent to said wedge and said specimen, a swept frequency oscillator, means for alternately coupling said transducers to said oscillator during mutually exclusive time intervals whereby the connected transducer may interchange electrical and sonic energy between said oscillator and material respectively to effect a marked increase in the loading of the former when its contemporary frequency corresponds to that at which a resonant mode is excited in the latter, means responsive to each such loading for deriving pulses substantially of the same amplitude and duration, and means for displaying said pulses upon the face of a cathode ray tube at positions thereon related to the contemporary oscillator frequency.

11. Sonic measuring apparatus for determining the thickness of a specimen of material, which apparatus comprises, a wedge of said material whose thickness is calibrated along its length, first and second transducers respectively arranged adjacent to said wedge and said specimen, a sweep oscillator whose frequency is repetitively swept at a first predetermined rate, means for alternately coupling said transducers to said oscillator during mutually exclusive sweep intervals whereby the connected transducer may interchange electrical and sonic energy between said oscillator and material respectively to effect a marked increase in the loading of the former when its contemporary frequency corresponds to that at which a resonant mode is excited in the latter, means responsive to each such loading for deriving pulses of substantially the same amplitude and duration, a cathode ray tube having first and second pairs of orthogonally oriented deflection plates, means responsive to the initiation of each sweep interval for deriving a deflection signal and applying same to said first pair of deflection plates whereby the beam of the cathode ray tube is deflected to occupy a position between said plates indicative of the contemporary frequency of said sweep oscillator, means for applying said pulses of substantially the same amplitude and duration to said second pair of deflection plates whereby the latter pulses are displayed on the cathode ray tube at positions indicative of the frequencies at which resonant modes are excited, said predetermined rate being of the order of 30 cycles per second whereby the display of pulses at the same position on the cathode ray tube during successive sweep intervals is viewed without flicker while other pulses are viewed with flicker.

12. Sonic measuring apparatus for determining the thickness of a sample specimen of material, which apparatus comprises, a swept frequency oscillator, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse in response to each resonant mode excited in said specimens, and means for displaying said pulses upon a cathode ray tube.

13. Sonic measuring apparatus for determining the thickness of a sample specimen of material, which apparatus comprises, an oscillator whose frequency is swept at a predetermined rate, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse in response to each resonant mode excited in said specimens, and means for displaying said pulses upon an oscilloscope time base swept at said predetermined rate.

14. Sonic measuring apparatus for determining the thickness of a sample specimen of material, which apparatus comprises, an oscillator whose frequency is swept at a predetermined rate, a calibrated specimen of material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse in response to each resonant mode excited in said specimens, and means for visually displaying said pulses upon a time base which is recurrently swept at said predetermined rate.

15. Sonic measuring apparatus for determining the thickness of a specimen of material, which apparatus comprises, a wedge of said material whose thickness is calibrated along its length, first and second transducers respectively arranged adjacent to said wedge and said specimen, an oscillator whose frequency is swept at a predetermined rate, means for alternately coupling said transducers to said oscillator during mutually exclusive time intervals whereby the connected transducer may interchange electrical and sonic energy between said oscillator and material respectively to effect a marked increasing in the loading of the former when its contemporary frequency corresponds to the frequency at which a resonant mode is excited in the latter, means responsive to each such loading for deriving pulses, and means for visually displaying said pulses on a time base which recurs at a rate which is an integral multiple of said predetermined rate.

16. Sonic measuring apparatus for determining the thickness of a specimen of material, which apparatus comprises, a wedge of said material whose thickness is calibrated along its length, first and second transducers respectively arranged adjacent to said wedge and said specimen, an oscillator whose frequency is recurrently swept at a predetermined rate, means for alternately coupling said transducers to said oscillator during mutually exclusive time intervals whereby the connected transducer may interchange electrical and sonic energy between said oscillator and material respectively to effect a marked increase in the loading of the former when its contemporary frequency corresponds to the frequency at which a resonant mode is excited in the latter, means responsive to each such loading for deriving pulses, and means for visually displaying said pulses upon a time base which recurs at a rate equal to said predetermined rate.

17. Sonic measuring apparatus for determining the thickness of a specimen of material, which apparatus comprises, a wedge of said material whose thickness is calibrated along its length, first and second transducers respectively arranged adjacent to said wedge and said specimen, a swept frequency oscillator, means for alternately coupling said transducers to said oscillator during mutually exclusive time intervals whereby the connected transducer may interchange electrical and sonic energy between said oscillator and material respectively to effect a marked increase in the loading of the former when its contemporary frequency corresponds to that at which a resonant mode is excited in the latter, means responsive to each such loading for deriving pulses, and means for displaying said pulses upon the face of a cathode ray tube at positions thereon related to the contemporary oscillator frequency.

18. Sonic measuring apparatus for determining the thickness of a specimen of material, which apparatus comprises, a wedge of said material whose thickness is calibrated along its length, first and second transducers respectively arranged adjacent to said wedge and said specimen, a sweep oscillator whose frequency is repetitively swept at a first predetermined rate, means for alternately coupling said transducers to said oscillator during mutually exclusive sweep intervals whereby the connected transducer may interchange electrical and sonic energy between said oscillator and material respectively to effect a marked increase in the loading of the former when its contemporary frequency corresponds to that at which a resonant mode is excited in the latter, means responsive to each such loading for deriving pulses, a cathode ray tube having first and second pairs of orthogonally oriented deflection plates, means responsive to the initiation of each sweep interval for deriving a deflection signal and applying same to said first pair of deflection plates whereby the beam of the cathode ray tube is deflected to occupy a position between said plates indicative of the contemporary frequency of said sweep oscillator, means for applying said pulses to said second pair of deflection plates whereby the latter pulses are displayed on the cathode ray tube at positions indicative of the frequencies at which resonant modes are excited, said predetermined rate being of the order of 30 cycles per second.

References Cited in the file of this patent

UNITED STATES PATENTS

| | | |
|---|---|---|
| 2,416,337 | Mason | Feb. 25, 1947 |
| 2,431,234 | Rassweiler et al. | Nov. 18, 1947 |
| 2,439,131 | Firestone | Apr. 6, 1948 |
| 2,618,968 | McConnell | Nov. 25, 1952 |
| 2,839,916 | Van Valkenburg et al. | June 24, 1958 |

FOREIGN PATENTS

| | | |
|---|---|---|
| 1,105,711 | France | July 6, 1955 |